United States Patent Office
3,121,477
Patented Feb. 18, 1964

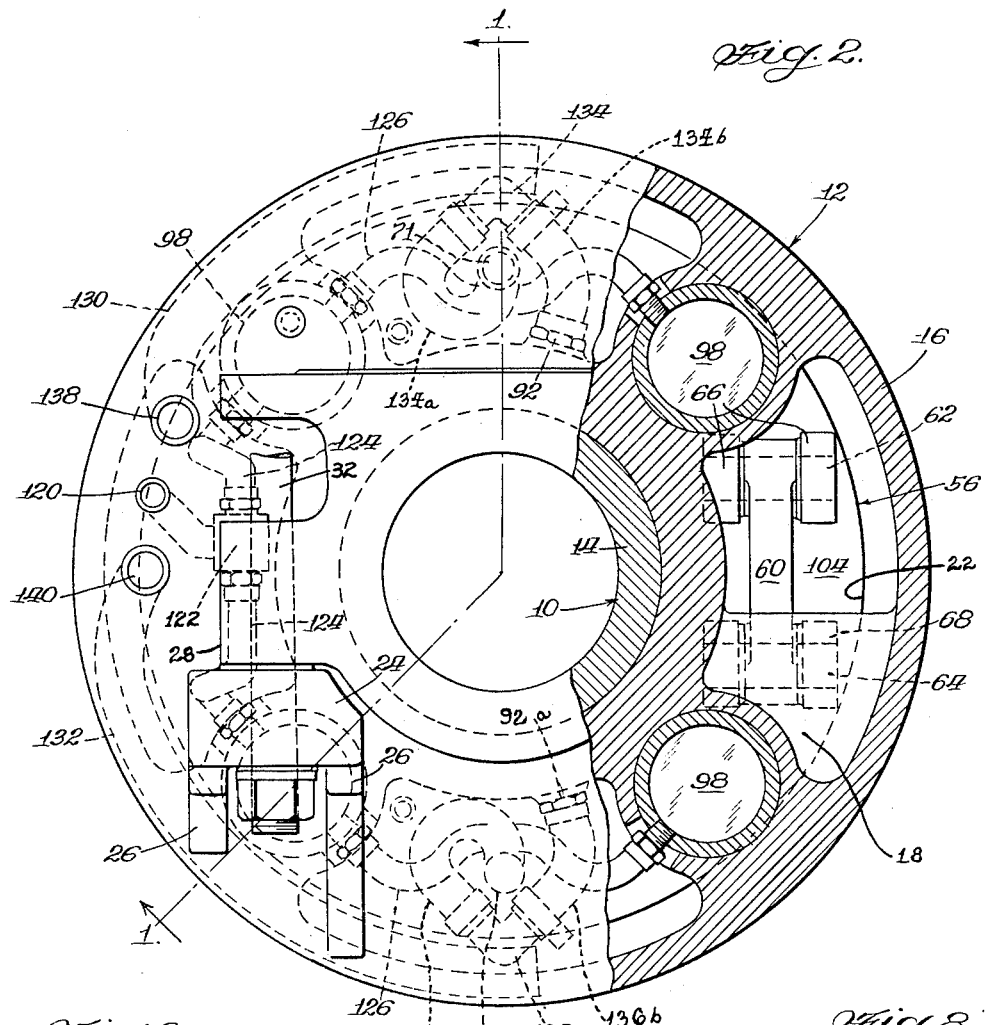

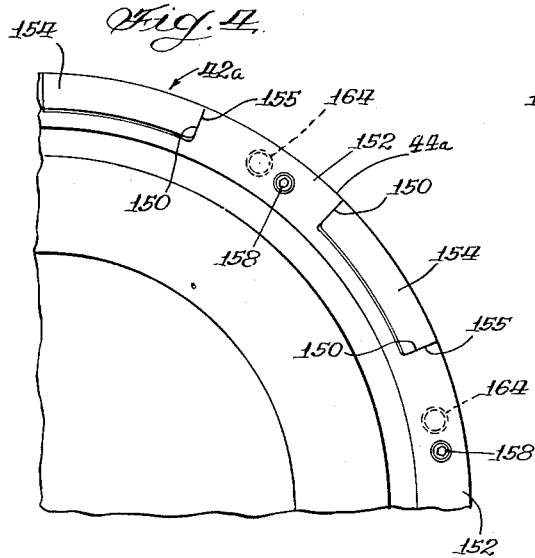
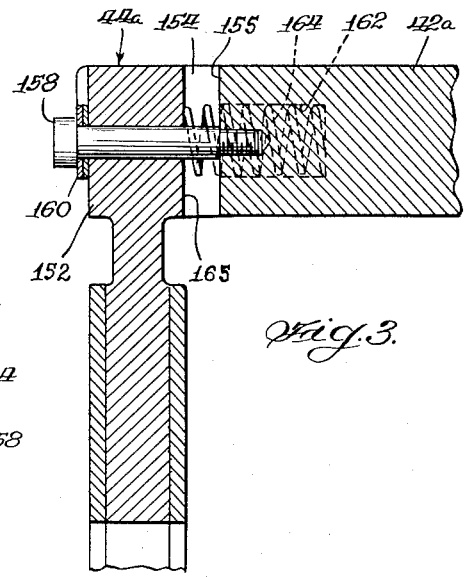
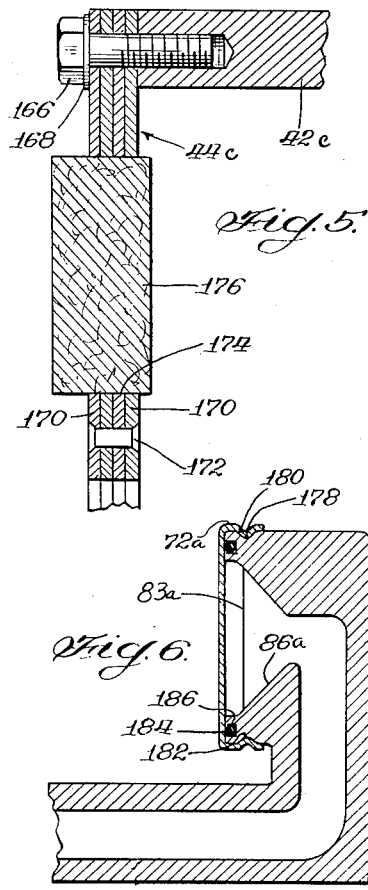
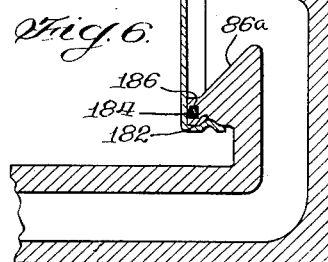
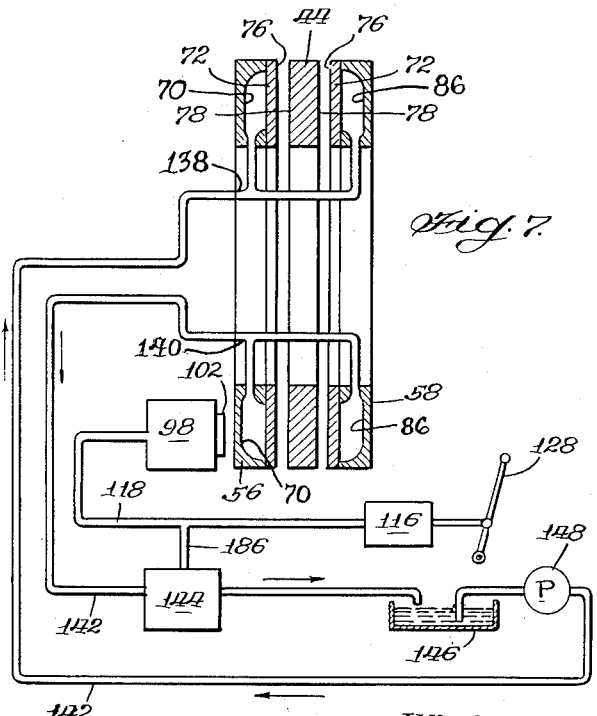

3,121,477
LIQUID COOLED DISK BRAKE ARRANGEMENT
Bernard Maloney, Gary, and Russell G. Altherr, Munster, Ind., and Robert D. Blew, Matteson, Ill., assignors to American Steel Foundries, Chicago, Ill., a corporation of New Jersey
Original application May 20, 1958, Ser. No. 736,644, now Patent No. 3,022,867, dated Feb. 27, 1962. Divided and this application Mar. 24, 1961, Ser. No. 98,153
4 Claims. (Cl. 188—72)

This invention relates to brakes and, more particularly, to off-wheel or disk type brake arrangements. This application is a division of our copending application for Liquid Cooled Disk Brake Arrangement, Serial No. 736,644 filed May 20, 1958, now Patent No. 3,022,867.

The invention comprehends an improved off-wheel brake arrangement of the type wherein friction walls of brake members are cooled by the circulation of liquid coolants in the members.

As is known to those familiar with the brake art, certain of the disk or clutch type brake arrangements comprise fixed and axially movable stators, disposed on opposite sides of a rotatable member or disk for engagement therewith. Additionally, these brake arrangements usually include an actuating member, engageable with the axially movable stator and operable to force the stator against the disk, which in turn, is forced against a fixed stator, whereby frictional engagement between the stators and the disk effects the deceleration of the disk.

Although there are numerous ways in which an axially movable stator can be urged into engagement with a related disk or friction member, a common method employed in the past has been the use of a hydraulically actuated annular piston, such as that disclosed in Patent No. 2,778,451, issued January 22, 1957, to R. G. Friedman.

The use of an annular piston of this type creates many problems in connection with the operation and maintenance of disk brakes. A principal objection to this type of actuating means, is that in the event that the piston becomes scored or otherwise damaged, it becomes necessary to disassemble the entire device to replace the annular piston. This is both time consuming and expensive because in these arrangements the annular piston forms a major component element of the brake mechanism.

Another disadvantage of the single annular actuating piston is that in the event of piston failure for reasons other than leakage of hydraulic fluid from the system, the entire brake is rendered inoperative; whereas, when a movable stator is actuated by a plurality of circumferentially spaced power cylinder pistons, if one piston fails to function, the brake can still be actuated by the remaining power pistons.

Yet another disadvantage of the single annular actuating piston is that after a relatively limited period of use, any uneven wearing of engaging elements may tend to cause the piston to cock or angle relative to its axis of operation. The chances of this angling are minimized where the movable stator is moved by the application of equal forces exerted by separate power cylinder pistons spaced circumferentially from each other.

In view of the above, it is therefore a primary object of this invention to provide a disk brake arrangement wherein a rotatable disk is engaged between a pair of stators, one of which is moved axially into engagement with the disk by a plurality of separate hydraulic pistons spaced circumferentially of the stator from each other.

Another important object of the invention is to provide an arrangement of the type described, wherein the friction surfaces of the disk or rotatable friction member are presented by a floating friction block, carried by the friction member for rotation therewith and for axial movement relative thereto.

A further object of the invention is the provision of a brake stator having a relatively thin wall presenting another friction surface engageable with a rotatable element to be braked and having an internal chamber adapted for the circulation of a coolant liquid therethrough against the inner surface of said wall.

A more specific object of the invention is the provision of means to increase the pressure value of the coolant liquid in the stator chamber at a rate in direct proportion to the rate of increase of the pressure value of the liquid in the hydraulic power brake actuating system in order to maintain approximately equal pressure values on opposite sides of the stator friction wall and thereby minimize the amount of localized stress exerted on the wall.

These and other objects of the invention will be apparent from an examination of the following descriptions and drawings wherein:

FIGURE 2 is an end elevational view of the structure illustrated in FIGURE 1, with portions of the structure shown in vertical section taken on line 2—2 of FIGURE 1;

FIGURES 3 and 4 are similar to FIGURES 1 and 2, but include only such portions of the structure as are necessary to illustrate another form of the invention;

FIGURE 5 is similar to FIGURE 3, but illustrates still another form of the invention;

FIGURE 6 is a fragmentary side elevational view, partly in vertical section, illustrating another feature of our invention;

FIGURE 7 is a schematic diagram illustrating brake actuating hydraulic fluid and coolant fluid circuits embodying yet other features of the invention;

Figure 1:
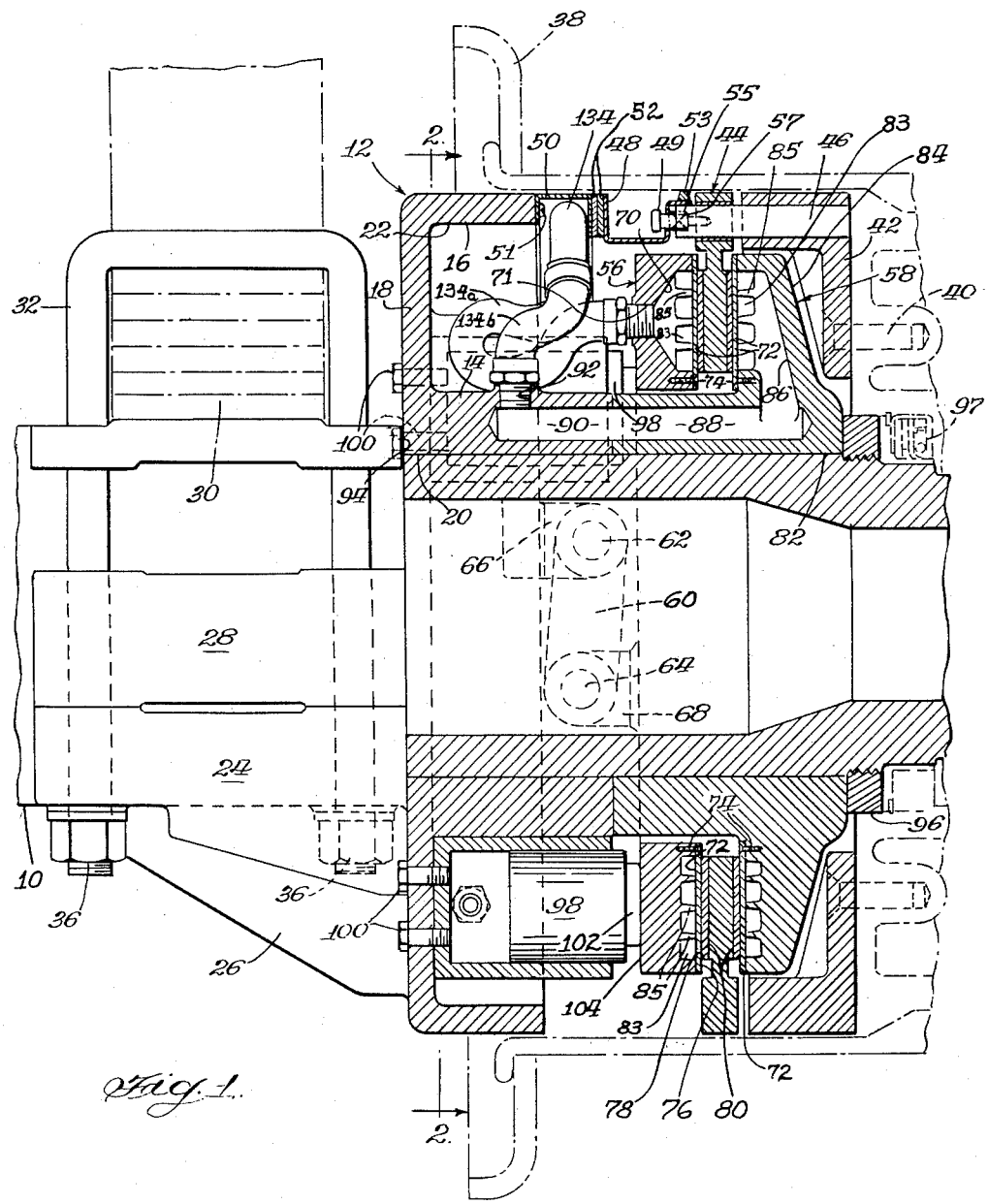
FIGURE 1 is a fragmentary front elevational view of a brake arrangement embodying features of the invention, with portions of the structure shown in vertical section taken on line 1—1 of FIGURE 2.

FIGURE 8 illustrated the choke valve between the brake actuating circuit and coolant fluid circuit shown in FIGURE 7; and FIGURE 9 is a vertical section taken on line 9—9 of FIGURE 8.

It will be understood that certain elements have been intentionally eliminated from certain views, where they are illustrated to better advantage in other views.

Referring now to the drawings for a better understanding of the invention, and particularly to the upper half of FIGURE 1, it will be seen that the brake arrangement, embodying features of the invention, is shown as attached to or mounted on an axle housing, indicated generally at 10, of a vehicle, not shown.

The brake mechanism includes a generally cylindrical housing or brake frame, indicated generally at 12, comprising inner and outer cylindrical walls 14 and 16, preferably formed integrally with and extending outboardly from an annular plate 18 having a central aperture 20 for receiving the axle housing 10. An annular cavity 22 is defined between the inner and outer cylindrical walls 14 and 16.

Although the brake frame 12 may be mounted on the axle housing in various ways, a preferred form is shown in FIGURE 1 of the drawings, where it can be seen that plate 18 is provided with a pair of inboardly extending shelves 24 (only one of which is shown), spaced from each other on opposite sides of the vertical center plane of the frame, each of the shelves being supported by a preferably inclined arm 26, interconnecting the inboard extremity of the related shelf with the lower portion of plate 18 and preferably integral therewith.

The axle housing 10 may be provided with a pair of outwardly extending, centrally disposed flanges or lugs 28 (only one of which is shown), to which are secured portions of an elliptical spring 30. The shelves 24 of the brake frame are disposed to fit under and engage the undersides of the lugs 28, and the frame is secured to the housing by means of a pair of U bolts 32 (only one of which is shown), spaced on opposite sides of the axle from each other and disposed to surround the springs and extend through axle housing flanges 28 and shelves 24. Each U bolt may be retained in position by a pair of nuts 36. In addition to offering support for the shelves, the arms 26 serve to transmit braking torque from the brake frame 12 to the axle housing 10.

Again referring to FIGURE 1 of the drawings, it will be seen that there is attached to the axle housing, outboardly of the brake frame 12, a wheel 38. Although the actual mounting of the wheel on the axle is not shown in detail, as it does not form an essential part of this invention, it will be understood that the wheel is rotatable relative to the fixed axle housing 10.

Secured to the wheel for rotation therewith in any desired manner, as by means of stud bolts 40, is an annular disk support 42. At the inboard side of its outer periphery, disk support 42 is connected to an outer peripheral portion of an annular friction member or disk 44. In the embodiment illustrated in FIGURE 1, it will be seen that the connection between disk 44 and support 42 comprises a plurality of pins 46 attached to support 42 and disposed to extend through both the disk and support, in a direction parallel to their rotational axes, in such a manner as to accommodate the axial movement of the disk relative to the support, the axial position of which is fixed relative to the axle housing of the vehicle.

In order to effect a closure of the gap between the outboard end of the brake frame wall 16 and the inboard end of disk support 42, and thereby prevent dirt and other foreign matter, such as ice and snow, from entering brake frame cavity 22, there may be provided a sealing device, comprising a pair of oppositely facing annular, U-shaped in section, elements 48 and 50 secured to disk support pins 46 and brake frame wall 16 by bolts or machine screws 49 and 51, respectively. The elements 48 and 50 may be provided with annular abutting pads 52, which permit relative rotation therebetween. To provide a dust seal between the rim of wheel 38 and the brake enclosure, element 48 may be provided with an annular sealing ring 53 attached thereto and disposed to surround the element.

A coil compression spring 55 sleeved on screw 49 and compressed between the outboard side of element 48 and a shoulder 57 presented by pin 46, serves to maintain the pads 52 of the respective elements 48 and 50 in snug engagement with each other even during relative rotation therebetween.

Still referring to FIGURE 1 of the drawings, it will be seen that adjacent the inboard and outboard sides of disk 44, there are provided a pair of stators 56 and 58, respectively: Inboard stator 56 is axially movable relative to the axle housing and brake frame, and outboard stator 58 is fixed relative to the axle housing and brake frame.

Axially movable stator 56, is annular in shape, having a central opening through which extends axle housing 10 and portions of stator 58. Stator 56 may be supported from the brake frame 12 by means of a pair of links 60, pivotally connected at opposite ends by pins 62 and 64 to outboardly and inboardly extending lugs 66 and 68, presented by the brake frame and stator, respectively.

Still referring to FIGURE 1 of the drawings, it will be seen that stator 56 is somewhat rectangular in section and has a pair of coolant liquid inlet openings or cavities (only one of which is shown) located at diametrically opposed sides thereof. The upper opening 70 is an inlet opening. The lower opening is an outlet opening but is not shown in FIGURE 1 as this view is not a symmetrical section view. On its inboard side stator 56 is provided with a pair of inlet and outlet ports 71 and 71a communicating with the respective inlet and outlet openings 70 of the stator. Only port 71 is shown in FIGURE 1, although both ports are shown in FIGURE 2. The inlet and outlet openings both communicate with a plurality of annular coolant liquid grooves or chambers 83 which are spaced radially from each other by a plurality of annular ribs 85.

The outboard wall of stator 56 is preferably in the form of a detachable friction plate 72, secured to the stator in any desired manner as by machine screws 74. Plate 72 is preferably formed of a thin sheet of a metal such as copper which has a relatively high thermal conduction capacity, and is adapted to close chambers 83 on one side and to present on its outboard side, a friction surface 76 engageable with friction surface 78 presented by a brake liner 80 attached to the adjacent side of disk 44.

Stator 58 comprises a cylindrical wall 82 sleeved over the axle housing 10 and abutting the inner wall 14 of the brake frame, preferably in interlocking relationship therewith, and a radially outwardly extending stator ring or head 84, formed in much the same manner as stator 56, and comprising an inlet opening 86, corresponding to inlet opening 70 in stator 56, and an outlet opening, not shown in FIGURE 1 but corresponding to the outlet opening of stator 56. The inlet and outlet openings of fixed stator 58 also communicate with a plurality of annular grooves or chambers 83 radially spaced from each other by a plurality of annular ribs 85. Stator 58 is also provided with an annular preferably copper friction plate 72 secured thereto by screws 74.

Fixed stator wall 82 is provided adjacent its inlet and outlet openings with a pair of axially extending passageways or channels, only the inlet passage way 88 being shown in FIGURE 1, which communicate with aligned inlet and outlet passageways 90, only the inlet passageway 90 being shown in FIGURE 1, in brake frame wall 14. Wall 14 is provided with a pair of inlet and outlet ports 92 and 92A communicating with respective passageways 90. In FIGURE 1 only inlet port 92 is shown, while in FIGURE 2 both are shown.

Fixed stator wall 82 and brake frame wall 14 are maintained in snug abutting relationship with each other, and against an axle housing shoulder 94, by means of a large nut 96, threadably received on the axle housing at the outboard side of the stator.

As best seen in the lower portion of FIGURE 1, floating stator 56 is urged into engagement with disk 44, which in turn is urged against fixed stator 58 by means of a plurality of hydraulic cylinders 98, located in brake frame cavity 22, and secured to plate 18 thereof in any desired manner, as by means of bolts or screws 100. There are preferably four hydraulic cylinders 98, only one of which is shown in FIGURE 1, spaced circumferentially of the frame or stator from each other at equal distances. Each of the cylinders comprises a piston 102, engageable with the inboard surface 104 of floating stator 56. In order to release the piston from the stator when the brake is in an applied position, there may be provided a release mechanism (not shown) of any desired type.

Power cylinders 98 are energized preferably by hydraulic fluid, supplied from any type of source not shown in detail but indicated diagrammatically in FIGURE 7 at 116. All four cylinders 98 may be connected to the hydraulic fluid supply line 118. The hydraulic fluid is transported from the line 118 through a port 120 (FIGURE 2) into a T-shaped manifold connection 122 located in brake frame cavity 22 and from there through lines 124 to the adjacent cylinders 98 and thence through the cylinders to the remote cylinders 98 through line 126. As seen in FIGURES 1 and 2, the cylinders and piping interconnecting the cylinders and the hydraulic circuit are all disposed within brake frame cavity 22. Thus, as the master cylinder 116 is actuated in any manner, as by brake lever 128, the master cylinder energizes the individual cylinders 98, causing their pistons 102 to engage adjacent movable stator 56 and urge the stator against the disk 44, causing the disk to move axially in an outboard direction toward the fixed stator 58, whereby the disk is compressed between the movable and fixed stators.

As is known to those familiar with the brake art, great quantities of heat are generated by the frictional engagement between related friction surfaces of the stators and disk during normal braking operations. In order to effect the rapid dissipation of that heat it is highly desirable to provide some method to cool the friction surfaces and thereby prevent the engaging parts from burning out.

This has been accomplished by the provision of the annular chambers 83 in the stators and means to circulate a coolant liquid, such as water, therethrough and against the inner surfaces of the friction plates 72.

Still referring to FIGURES 1 and 2, it will be seen that within the annular cavity 22 of the brake frame 12, there is provided a pair of upper and lower coolant liquid inlet and outlet manifolds 130 and 132 provided at corresponding ends with Y type connectors 134 and 136, respectively.

As best seen in FIGURE 2, connector 134 includes a pair of pipe lines 134a and 134b communicating with inlet ports 71 and 92, respectively. Connector 136 includes a pair of pipe lines 136a and 136b communicating with outlet ports 71a and 92a, respectively. Lines 134a and 136a are flexible lines which accommodate axial movement of stator 56.

The manifolds 130 and 132 are provided at their opposite extremities with ports 138 and 140, respectively, which communicate with pipe line 142 of a coolant liquid circuit which in turn includes a choke valve 144, a reservoir 146, and a constant volume pump 148. The details of the liquid coolant and hydraulic circuits are shown in the schematic diagram of FIGURE 7 and will be described in detail in a later portion of the specification.

Referring now to FIGURES 3 and 4 of the drawings, it will be seen that there is illustrated therein a slightly modified form of the invention. In this arragement, a disk 44a, similar to the previously desciled and illustrated disk 44, is carried by a disk support 42a by splined connection which accommodates axial movement of the disk relative to the support in much the same manner as does pin 46 in the previously described embodiment. As best seen in FIGURE 4, the outer periphery of disk 44a is provided with cut-out or notched axially extending grooves or slots 150 spaced circumferentially of the disk from each other to present therebetween radially outwardly extending lugs 152. In a like manner, disk support 42a is provided at its inboard edge with a plurality of axially extending projections 154, spaced circumferentially of the support from each other to define therebetween a plurality of axially extending slots 155.

Disk 44a is carried by support 42a, for rotation therewith and for axial movement relative thereto, with disk lugs 152 received within support slots 155, and with support projections 154 received within disk slots 150 to provide snug splined engagement between the disk and support. The support is maintained in engagement with the disk by means of a plurality of shoulder screws 158 located and spaced circumferentially from each other and disposed to extend through alternate disk lugs 152 and into support 42a.

As best seen in FIGURE 3, there is ample clearance provided in slot 155 between the disk lugs 152 and the support 42a, to accommodate axial movement of the disk relative to the support. Screws 158 are preferably shoulder screws, threadably received within the support. A plurality of washers 160 are provided between the head of the screws and the inboard surface of the disk to limit inboard movement of the disk, relative to the support. Additionally, the support may be provided with a plurality of internal axially extending bores 162, in which are disposed coil compression springs 164, compressably interposed between the support and the outboard surface 165 of the disk. The springs 164 serve as a release mechanism to urge the disk in an inboard direction away from the fixed stator when the brake is in an inoperative or a non-applied position.

Now referring to FIGURE 5 of the drawing, it will be seen that there is illustrated therein a modified form of the invention. The primary difference between this embodiment and the previously described embodiments of the invention is that in this embodiment, a rotatable friction member or disk 44c is rigidly secured to the disk support member 42c by means of screws 166 and washers 168, so that axial movement between disk 44c and disk support 42c is prevented. Disk 44c may be a one-piece article or, if desired, may, as illustrated in FIGURE 5, comprise a plurality of annular plates 170, secured to each other in any desired manner as by rivets 172, only one of which is shown, to provide a unitary brake ring having a plurality of circumferentially spaced openings 174 (only one of which is shown) within which are carried floating brake liners 176 preferably formed of a friction composition of the type normally employed for brake linings. Liners 176, although rotatable with disk 44c are free for axial movement relative thereto, the extent of such axial movement being limited only by the friction surfaces of the movable and fixed stators disposed adjacent opposite sides of the disk. The operation of this embodiment is similar to that of the previously described embodiments wherein the pistons of the hydraulic cylinders urge the movable stator axially in an outboard direction, causing it to engage floating liners 176 and compress them against the fixed stator 58.

FIGURE 6 of the drawings illustrates another feature of the invention, wherein friction plates 72a of the fixed and movable stators (only the fixed stator being shown, as the arrangement in the movable stator is similar) can be detachably secured to the ring or head 84a of the stator in order that they may be readily removed with a minimum of time and effort. In this arrangement, the head or ring 84a of the stator, presents adjacent its inboard edge, a pair of annular grooves 178 adapted to receive the outboardly extending off-set annular flanges 180 of plate 72a, which has been provided with a pair of inwardly extending rims or lips 182. Thus, by virtue of the flexibility of the metal in the plate 72a, it may be snapped in position over the head of the stator with the inwardly extending rim 182 tightly disposed wthin annular groove 178 to close coolant liquid chamber 86a. In order to insure a fluid-tight fit between the plate and the head of the stator, a pair of conventional O ring type seals 184, disposed within recesses 186 of the stator head, may be provided. The seals serve to prevent the flow of any liquid between the engaging surfaces of plate 72a and stator head 84a and thereby retain it in chamber 83a.

As was previously mentioned, it is highly desirable in liquid cooled brake arrangements of this type to form the stator friction walls, plates 72 in FIGURE 1 or 72a in FIGURE 6, of a relatively thin sheet of metal having a relatively high rate of thermal conduction because the more rapidly the heat caused by frictional contact can be transmitted to the coolant liquid, the more rapidly the heat can be dissipated by the coolant liquid. A serious problem resulting from the use of a thin metal plate of the appropriate composition, such as copper, is that the varying forces exerted on opposite sides of the metal by the braking action and liquid coolant, respectively, tend to deform the plate and thereby prevent perfect frictional engagement by the braking surfaces along a smooth flat surface. Also, the force of the liquid coolant, if too great, can cause the plate to separate from the stator head and permit the coolant to leak out of the circuit, thereby greatly impairing, if not completely preventing, proper functioning of the brake. Although, in the embodiment of the invention, shown in FIGURE 1 of the drawings, the stator head is provided with a plurality of ribs 85, which form the radially spaced annular grooves 83 and which also serve to offer additional support for the plate 72, it would be even more desirable to have an arrangement such as that illustrated in FIGURE 6, wherein the extra supporting ribs 85 are eliminated and the entire coolant chamber 83a is completely open, so that the coolant liquid is free to contact all of the inner surface of plate 72a. In order to permit such an arrangement, it is necessary to equalize the stresses or pressures exerted on opposite sides of the plate by the coolant liquid pessure and the brake pressure, respectively.

Turning now to FIGURE 7, a schematic diagram illustrating a novel pressure equalizing arrangement, it will be seen that the coolant liquid passes out of port 140 through line 142 and back to the inlet port 138, via choke valve 144, reservoir 146, and constant volume pump 148. Because the purpose of choke valve 144 is to increase the pressure in the coolant liquid circuit in direct proportion to that of the pressure value in the hydraulic circuit, it is afforded communcation with hydraulic circuit line 118 by means of auxiliary line 186.

FIGURES 8 and 9 are top plan and vertical sectional views, respectively, of choke valve 144 (the position of which is inverted in FIGURES 8 and 9), which is preferably annular, comprising a central cylindrical housing or body 188, having an internal longitudinal extending bore 190 within which is disposed a piston 192. The piston is retained within the bore by means of a bonnet or cap 194, threadably received within one end of the bore. At one end, the bore presents a cylindrical cavity or choke chamber 196, which communicates with a pair of transversely extending coolant inlet and outlet ports 200 and 198, respectively. The piston is movable into chamber 196 to restrict the flow of liquid coolant in the line 142 from the coolant inlet port 200 to the coolant outlet port 198. At the end of the piston remote from chamber 196 the piston is provided with a cylindrical extension 202, slidably received within a coaxial bore 204, within cap 194. In order to effect a liquid-tight seal between extension 202 and axial bore 204, one or more O-ring type seals 206 may be provided. At its outer extremity, bore 204 is provided with a port 208 which communicates with pipe line 186 leading to the main hydraulic circuit line 118.

Thus, it will be understood that as the pressure builds up in the hydraulic circuit line 118, the pressure is transmitted through line 186 and port 208 to extension 202 of the circuit valve piston 192, causing the piston to move upwardly and close or restrict the size of choke chamber 196 and thereby decrease the flow of coolant liquid through the choke valve. Inasmuch as pump 148 is a constant volume pump, the coolant liquid is being forced into the circuit from reservoir 146 at a greater volume rate than the rate of return, so that the pressue value in the coolant liquid circuit is increased at a rate in direct proportion to the rate of increase of the pressure value of the hydraulic circuit. In this way, the forces exerted on opposite sides of the plates 72 or 72a are maintained in approximately equal relationship to minimize or eliminate any stress on the plates. In order to prevent the piston 192 from moving into and restricting the opening in choke chamber 196 when it is not necessary, a coil compression spring 210 may be interposed between a flange 212, presented by the piston 192 and an off-set portion or shoulder 214 presented within bore 190.

In view of the above, it will be seen that we have provided an invention comprising a highly efficient, compact liquid cooled disk brake arrangement, wherein a rotatable friction member to be braked is compressed between a pair of stators which are actuated by a plurality of circumferentially spaced pistons of independent hydraulic cylinders and wherein the friction surfaces of the stators and disk are efficiently cooled by a novel cooling system, which is formed and adapted to afford the maximum amount of thermal dissipation of the heat generated by the frictional resistance in the braking operation.

We claim:

1. In an off wheel brake arrangement for a vehicle having a wheel and axle assembly, the combination of: an annular disk support secured to said wheel for rotation therewith; a disk disposed inboardly of said disk support and presenting a pair of friction surfaces; a plurality of pins having corresponding ends attached to said disk support, said pins extending through complementary openings of the disk to accommodate axial movement of said disk relative to said support and interlock the disk therewith for rotation with the wheel; a brake frame non-rotatably mounted around said axle, inboardly from said wheel, said brake frame including an annular plate extending radially outward from said axle, said annular plate having a cylindrical wall formed integrally therearound and extending in an outboardly direction therefrom; a first annular ring secured around the outboard end of said cylindrical wall; a first abutting pad disposed around and fixed to the outboard end of said first annular ring; a second annular ring disposed outboardly from said first annular ring; a second abutment pad secured to the inboard end of said second annular ring; a plurality of screws extending through apertures in said second annular ring and extending into the inboard end of said plurality of pins; a plurality of compression spring means sleeved on respective screws between said second annular ring and said inboard end of said pins for urging said second annular ring inboardly so as to urge said second abutment pad into engagement with said first abutment pad to provide a seal therebetween; an annular sealing ring compressed between said second annular ring and said wheel to provide a seal therebetween; and means provided on the brake frame for decelerating rotation of the friction surfaces of said disk.

2. In a brake arrangement for a wheel and axle assembly, the combination of: an annular disk support secured to said wheel for rotation therewith; a plurality of pins having corresponding ends attached to said disk support; a disk presenting a pair of axially movable friction surfaces, said pins extending through openings of said disk to accommodate axial movement of said disk relative to said support and to interlock the disk for rotation therewith; a brake frame non-rotatably mounted around said axle; means mounted on said frame for braking the friction surfaces of said disk, said frame having a wall, a first annular ring secured to said wall, a first abutment pad secured to said ring, said first pad presenting a first abutment surface; a second annular ring connected to the support for rotation therewith; a second abutment pad secured to said second annular ring and presenting a second abutment surface; a plurality of resilient means operatively connected to said annular ring for urging said second abutment surface into engagement with said first abutment surface to provide a seal therebetween; and an anular sealing ring compressed between said annular ring and said wheel to provide a seal therebetween.

3. In a brake arrangement for a wheel and axle assembly, the combination of: a brake frame non-rotatably mounted around said axle; an annular end wall integrally formed radially outwardly on said brake frame to partly define a chamber in said brake frame adjacent said axle, said wheel and said wall; fixed annular abutment means secured to said end wall at its outboard end; a plurality of pins; means for securing said pins to rotate with said wheel; an annular ring; means to secure said annular ring to said pins; an abutment means secured to said annular ring, resilient means for urging said last-mentioned abutment means into engagement with said fixed abutment means; a disk supported by said pins for rotation therewith and presenting a pair of friction surfaces within said chamber, said disk being slidably mounted on said pins to accommodate axial movement of said disk relative to said wheel; a pair of stators disposed on opposite sides of said disk for engagement with respective friction surfaces, one of said stators being fixed to said brake frame, said other stator being suspended around said brake frame; suspension means connecting said other stator to said frame for movement relative to said frame axially of said assembly; a plurality of power cylinders supported by said brake frame within said chamber and including pistons engageable with said other stator at locations in spaced relationship to each other adjacent one side of said other stator and being operable to urge said other stator toward said fixed stator to compress the friction surfaces of said disk between said stators; a plurality of hydraulic lines interconnecting said cylinders, said hydraulic lines being within said chamber; and an inlet port in said frame communicating with one of said hydraulic lines so that hydraulic action through said port and said one hydraulic line causes actuation of all of said pistons of said power cylinders.

4. In a brake arrangement for a rotatable disk the combination of: a rotatable disk support; said brake disk splined to said disk support for rotation therewith and to permit axial movement of the disk with respect to the support; a plurality of shoulder screws spaced circumferentially from each other and extending through openings of said disk, said screws being fixed to said disk support; a plurality of readily removable washers disposed between the head of each screw and said brake disk to limit movement of said brake disk relative to the support; a plurality of axially extending bores in said disk support; a compression spring in each bore under compression between said support and said disk, said springs urging said brake disk against said washers; said brake disk presenting a pair of opposed friction surfaces; a brake frame; a first stator member supported by said brake frame and having a fixed position relative thereto; said first stator member at times engageable with one of said friction surfaces; a second stator disposed adjacent other of said friction surfaces; means movably connecting the second stator to the frame for accommodating axial movement of said second stator with respect to said frame; and power means operable to axially move said second stator to engage said other friction surface and thereby axially move said brake disk against the compressive force of said spring, to engage said first mentioned friction surface against said first stator member.

References Cited in the file of this patent
UNITED STATES PATENTS

| | | |
|---|---|---|
| 854,720 | Dawson | May 28, 1907 |
| 2,260,189 | Morrison | Oct. 21, 1941 |
| 2,771,966 | Davey | Nov. 27, 1956 |
| 2,827,132 | Buyze | Mar. 18, 1958 |
| 2,860,738 | Johansen | Nov. 18, 1958 |
| 2,911,071 | De Gelleke | Nov. 3, 1959 |

FOREIGN PATENTS

| | | |
|---|---|---|
| 538,028 | Italy | Jan. 16, 1956 |